United States Patent [19]

Cornet

[11] 4,360,895

[45] Nov. 23, 1982

[54] PERMANENT MEMORY STRUCTURE WITH THERMO-OPTICAL WRITING AND OPTICAL READING AND WRITING PROCESS IN SUCH A STRUCTURE

[75] Inventor: Jean Cornet, Paris, France

[73] Assignee: Thomson-CSF, Paris, France

[21] Appl. No.: 228,722

[22] Filed: Jan. 27, 1981

[30] Foreign Application Priority Data

Feb. 1, 1980 [FR] France ............................ 80 02246

[51] Int. Cl.³ ...................... G11C 13/04; G11B 7/24
[52] U.S. Cl. ............................ 365/127; 346/135.1; 369/100; 369/284; 365/126
[58] Field of Search ............... 365/120, 124, 126, 127; 369/100, 127, 130, 275, 283, 284, 288; 346/76 L, 135.1

[56] References Cited

U.S. PATENT DOCUMENTS

| 3,560,994 | 2/1971 | Wolff et al. ...................... 346/135.1 |
| 4,004,080 | 1/1977 | Vossen et al. ........................ 369/283 |
| 4,264,986 | 4/1981 | Willis ................................. 365/127 |
| 4,285,056 | 8/1981 | Bell ..................................... 369/100 |
| 4,300,227 | 11/1981 | Bell ..................................... 369/100 |

FOREIGN PATENT DOCUMENTS 2701218 5/1978 Fed. Rep. of Germany .
2744533 4/1979 Fed. Rep. of Germany .

OTHER PUBLICATIONS

Cuomo et al., "Digital Recording by Thin Film Spalling", IBM Tech. Disc. Bul., vol. 21, No. 2, 7/78, pp. 859–860.
Chemical Abstracts, vol. 73, No. 22, 11/30/70.

*Primary Examiner*—Stuart N. Hecker

[57] ABSTRACT

The invention relates to a permanent memory structure supported by a moving substrate.

This substrate is formed by two metal layers (9, 10) vacuum-deposited on the relatively inexpansible substrate (1). One of the two metal layers is very expansible (9), while the other layer (10) is relatively inexpansible, but ductile. During inscription by the laser beam, the beam energy absorbed by the layers (9, 10) produces an elongation of the expansible layer (9), which deforms the ductile layer (10) by stretching it beyond the elastic limit. There is a permanent deformation of the two-layer assembly, without perforation.

Particular application to optical disks.

7 Claims, 3 Drawing Figures

PRIOR ART FIG.1
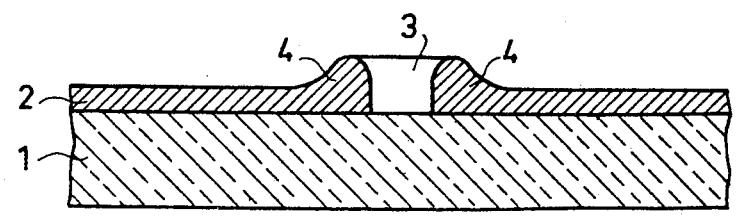
PRIOR ART FIG.2
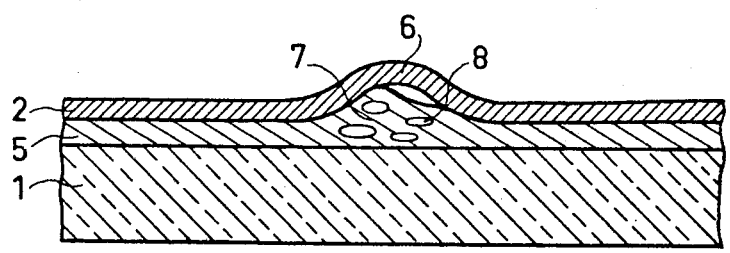
FIG.3
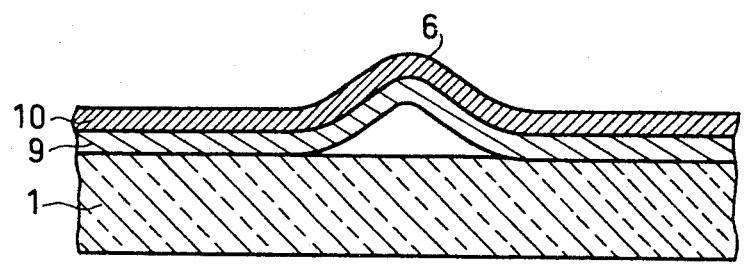

PERMANENT MEMORY STRUCTURE WITH THERMO-OPTICAL WRITING AND OPTICAL READING AND WRITING PROCESS IN SUCH A STRUCTURE

BACKGROUND OF THE INVENTION

The invention relates to a permanent memory structure, which can be thermo-optically inscribed or written and optically read.

It more particularly applies to data storage means having an optical access. The invention may be described with reference to the non-limitative example of disks known under the generic term optical disks on which data are thermally recorded and permanently stored and are optically read. These disks have an inscribable layer, whose local modification constitutes the recording of the data.

The stored data can be in analog or binary form. Both cases fall within the scope of the invention. The stored data are read by processes based on transmission through the inscribable layer or on the diffraction on said layer of a light beam, followed by conversion into electrical signals.

According to the prior art an optical disk is read by transmission or reflection of a light beam, generally a laser beam through the disk support material which is transparent and covered with an absorbent and reflecting layer. Writing or inscription takes place by thermal ablation of the absorbent layer in which a hole is formed. The reading light beam passes through this hole and supplies an electric signal, whilst its reflection by the layer corresponds to the absence of a signal in the case of reading by transmission. If reading is by reflection, the electrical response is reversed.

The disadvantage of this inscription process by ablation is that the edges of the holes are not planar and clearly defined, so that a background noise occurs during the reading of the optical disk. During inscription the absorbent layer is not volatilized and is instead melted. The molten material is located around the holes in the form of a collar where it is regrouped as a result of capillarity forces in the molten material.

Moreover, it is difficult to duplicate these disks, because it requires a perfect reproduction of the holes in a layer, which itself only has a thickness of a few dozen nanometers. Moreover, it transforms an amplitude contrast into a phase contrast, which in certain cases is disadvantageous for reading purposes.

According to another prior art form the absorbent layer, i.e. the writing layer of the optical disk is only deformed as a result of thermal expansion or deterioration of an underlying polymer layer which expands under the action of the heat of an inscription light beam.

In the case where only the absorbent layer is deformed the reading of the video disk takes place by reflection, either with respect to one fact of the disk by reading the protuberances of the inscription layer, or by the other face of the disk and across the support thereof whilst reading the grooves or slots of the inscription layer.

The disadvantage of said second optical disk structure is that although duplication is possible, it requires two preparation stages with different technologies, one for the underlying polymer layer and the other for the metal layer. Moreover, and as will be shown hereinafter in greater detail, this structure is in certain cases very fragile and difficult to manipulate.

BRIEF SUMMARY OF THE INVENTION

According to the invention an optical disk is provided with a permanent memory structure, constituted by a heat-sensitive inscription layer, itself formed by at least one double metal layer which permanently deforms under the action of a laser beam. This result, obtained without any subsequent mechanical or chemical treatment is due to the association of a first layer of highly expansible metal and a second layer of a ductile, but relatively inexpansible metal. In this memory structure the data are recorded in a non-erasable manner in the form of a deformation of the double layer, without perforation.

More specifically the present invention relates to a permanent memory structure with thermal writing or inscription and optical reading, supported by a forwardly moving substrate, wherein the substrate is made from a material with a low expansion coefficient and the inscribable layer deposited on the substrate comprises at least one double metal layer having a high differential expansion coefficient between the very expansible material of the first metal layer and the only slightly expansible, but ductile material of the other metal layer.

BRIEF DESCRIPTION OF THE DRAWINGS

The invention is described in greater detail hereinafter relative to non-limitative embodiments and with reference to the attached drawings, wherein show:

FIG. 1 a prior art point memory structure with perforation of the inscription layer.

FIG. 2 another prior art point memory structure with deformation of the inscription layer.

FIG. 3 a point memory structure according to the invention.

DETAILED DESCRIPTION OF THE PREFERRED EMBODIMENTS

FIG. 1 is a sectional view of a very small fragment of an optical disk corresponding to a point memory. This is the best known structure in which the perforation of the inscription layer permits reading by reflection or transmission.

The support 1 or substrate of the optical disk is generally constituted by a plate of an organic transparent material, such as a methyl polymethacrylate or a mineral glass. An, in general, metal layer 2 is deposited on substrate 1. During the inscription or writing of the data, the absorbent inscription layer 2 is perforated at 3 by melting the layer under the action of heat supplied in known manner by a laser beam. However, although the energy supplied by the laser is adequate to melt the metal of the layer 2 without damaging organic substrate 1, it is not adequate for volatilizing the metal quantity corresponding to the hole 3. As a result this metal appears on the completed disk in the form of a collar 4 around the hole. This collar forms as a result of surface tensions in the molten metal and in the metal close to the melting point around hole 3. Even though collar 4 only has a thickness of a few nanometers, it has the disadvantage of causing a relatively high background noise during reading, because the edge of the collar which passes under the laser reading beam twice during the rotation of the disk can significantly and randomly modify the reading signals from the disk surface between the holes.

FIG. 2 is a sectional view of another prior art point memory obtained by deformation of the layer, without perforations.

The optical disk comprises a rigid substrate 1 which, as in the case of FIG. 1, is made from a transparent material such as an organic or mineral glass. It is firstly covered by a polymer layer 5 and then by a metal layer 2. During laser illumination of the disk the energy quantity supplied by radiation is absorbed by the metal layer 2 and is transmitted to polymer layer 5 adjacent thereto in the impact area of the laser beam. The heat transmitted to the polymerized material of layer 5 leads to the start of thermal deterioration with local swelling at 7 and as metal layer 2 only has a thickness of a few nanometers it is forced back by the expanding polymer, which forms a protuberance 6. The reading of data stored in protuberance form results from the diffraction of a light beam either on the convex part of the protuberance, or on its concave part through the thickness of the disk, i.e. through substrate 1.

However, this point memory structure can have a number of disadvantages. Firstly it involves the use of two different technologies (one for the polymer and the other for the metal layer). Furthermore, the polymers can have a limited life, particularly in very humid or corrosive atmospheres or in the presence of solvents or as a result of light radiation, e.g. sunlight. It is therefore necessary in most cases to protect the structure, e.g. by a cover or a varnish and to keep it in darkness.

FIG. 3 shows a point memory structure according to the invention. A first metal layer 9 is deposited on a planar, rigid support 1 by vacuum atomization or any other known method. Layer 9 is itself covered by a second metal layer 10. FIG. 3 shows a point memory when it has been recorded, but initially on an unused disk the two metal layers 9 and 10 are perfectly planar and adhere to substrate or support 1.

The special feature of the point memory structure according to the invention is that the first metal layer is constituted by a first metal, whose thermal expansion coefficient is very high, whilst the second metal layer is constituted by a second metal, whose thermal expansion coefficient is not very high, but which is very ductile. According to the embodiment of FIG. 3 the very expansible metal forms layer 9, which is sandwiched between the substrate and the second metal layer, whilst the relatively inexpansible metal forms the outer layer 10.

When a laser beam strikes the metal surface of the disk, the energy quantity which it supplies is absorbed by the assembly of the two layers 9 and 10, each of which has a thickness between approximately 3 and 5 nanometers, i.e. 6 to 10 nanometers in all. In the case of such a thickness the optical absorption coefficient is close to 50% and half the energy supplied by the laser pulse creates an expansion in the metal layers. Thus, as the two metal layers have different expansion coefficients, it follows that the more expansible layer imposes its deformation on the less expansible layer and that the latter, following cooling of the assembly, retains a deformed configuration because the metal forming the less expansible layer is very ductile. Elongation makes it exceed its elastic limit without exceeding its breaking limit and consequently the ductile layer remains deformed after cooling.

After cooling the point memory the disk surface has a deformation 6, which is permanent in the case of the ductile metal. The more expansible metal, i.e. layer 9 in the case of FIG. 3 can either be separated from the ductile metal, or can remain adhered thereto, but in the latter case the tensile forces on cooling tend to slightly reduce protuberance 6.

To obtain a permanent, readable deformation of the two metal layers, it is necessary and sufficient if the energy supplied by the laser beam gives the two layers a temperature of a few hundred degrees Celsius, but in all cases below the melting temperature of the metal with the lowest melting point.

For example the layer formed by a very expansible metal can advantageously be constituted by one of the following metals:

| Metal: | Cd | Zn | Tl | Mg | Al | Mn | Ag |
|---|---|---|---|---|---|---|---|
| Expansion coefficient in $10^{-6}.K^{-1}$ | 53 | 53 | 36 | 27 | 24 | 23 | 20 |
| The less expansible, but ductile metal is chosen from: | | | | | | | |
| | Mo | Zr | Ti | Ta | Cr | Pt | | which all have a thermal expansion coefficient below $10.10^{-6}.K^{-1}$.

Various variants are possible to the point memory of FIG. 3 and as defined hereinbefore.

Firstly the order of the very expansible and the relatively inexpansible layers can be reversed compared with what has been indicated hereinbefore, i.e. the very expansible layer 9 can be deposited on the relatively inexpansible layer 10, which is consequently sandwiched in the disc structure. However, the first structure proposed is preferable, because the very expansible metal exerts a pressure on the relatively inexpansible metal, so that there is no risk of disengagement between the two layers. In the opposite case, i.e. when layer 9 is on the outside of the structure, the very expansible metal exerts a pull on the relatively inexpansible metal and there is a risk of disengagement between the two layers. Thus, the data will not be inscribed in the form of a deformation because, after cooling, as the relatively inexpansible layer has not exceeded its elastic limit there has been no permanent deformation.

In addition, each of the layers can be produced by a combination or an alloy between two or more metals of each of the two groups.

Finally although the two-layer structure is simple and facilitates the understanding of the invention, it does not exclude the use of a larger number of layers. For example it is possible to have a first attachment layer to the substrate, the two layers of two materials having a differential expansion coefficient of interest for the Application, whilst a fourth oxidation-inhibiting layer gives the surface of the disk and in particular the protuberances an appearance or reflection coefficient of interest for reading the video disk. Other solutions or combinations can also be envisaged.

This permanent point memory structure is of interest for various reasons.

Firstly it only uses a single constructional technology, i.e. the two metal layers, or, in more general terms, all the metal layers deposited on the substrate can be produced during a sequence of operations in the same vacuum frame, whereas the previously made structures in certain cases required changes when depositing a polymer layer or one or more metal layers.

Secondly the inscription obtained in the form of a protuberance 6 is rigid, because it is formed by two metal layers and permits a reproduction by relatively easy means, if reproduction is necessary.

The protection of the recorded surface, whenever this is necessary, can be provided by varnishes, photosensitive or thermo-sensitive laquers or a mechanical covering. When long-term preservation is required, such as the storage of data for a number of years, it is possible to form an archive or file following coating of the metal surface of the disk with a thick metal layer.

Finally the reading of the recorded data remains compatible with the reading process and means either by the face of the disk corresponding to the protuberance, or across the support of the disk if the latter is made from a transparent material and in this case the groove or slot of the metal deformation is read.

The present invention is not limited to the embodiments expressly described hereinbefore. It relates to rigid or flexible and planar or cylindrical supports effecting a rotary or linear movement. It includes the variants covered by the scope of the following claims.

What is claimed is:

1. A permanent memory structure with thermal writing or inscription and optical reading, supported by a forwardly moving substrate, wherein the substrate is made from a material with a low expansion coefficient and the inscribable layer deposited on the substrate comprises at least one double metal layer having a high differential expansion coefficient between the very expansible material of the first metal layer and the only slightly expansible, but ductile material of the other metal layer.

2. A memory structure according to claim 1, wherein the very expansible metal layer is placed between the substrate and the relatively inexpansible, but ductile metal layer.

3. A memory structure according to claim 1, wherein the relatively inexpansible, but ductile metal layer is placed between the substrate and the very expansible metal layer.

4. A memory structure according to claim 1, wherein the very expansible metal layer is made from the following metals: Cd, Zn, Tl, Mg, Al, Mn, Ag, either individually or in alloy form.

5. A memory structure according to claim 1, wherein the relatively inexpansible metal layer is made from the following metals: Mo, Zr, Ti, Ta, Cr, Pt, individually or in alloy form.

6. A memory structure according to claim 1, wherein inscription or writing is in the form of a permanent deformation of the ductile layer, said deformation exceeding the elastic limit, but being below the breaking limit of the ductile layer.

7. An inscription or writing process in a memory structure according to any one of the preceding claims wherein the inscription layer is deformed by a laser beam, whose thermal energy is absorbed by the double metal layer and, in the ductile layer, is transformed into a mechanical deformation by elongation beyond the elastic limit, but less than the breaking limit.

* * * * *